US006685757B2

(12) United States Patent
Xu et al.

(10) Patent No.: US 6,685,757 B2
(45) Date of Patent: Feb. 3, 2004

(54) POLISHING COMPOSITION

(75) Inventors: Haofeng Xu, Newark, DE (US); John Quanci, Haddonfield, NJ (US)

(73) Assignee: Rodel Holdings, Inc., Wilmington, DE (US)

(*) Notice: Subject to any disclaimer, the term of this patent is extended or adjusted under 35 U.S.C. 154(b) by 0 days.

(21) Appl. No.: 10/081,707

(22) Filed: Feb. 21, 2002

(65) Prior Publication Data

US 2003/0154659 A1 Aug. 21, 2003

(51) Int. Cl.$^7$ .............................. C09G 1/02; C09G 1/04
(52) U.S. Cl. ................................. 51/308; 100/3; 100/5
(58) Field of Search ................. 51/308; 106/3, 106/5; 438/692, 693; 216/96; 252/79.5, 79.1

(56) References Cited

U.S. PATENT DOCUMENTS

| | | | |
|---|---|---|---|
| 5,352,277 A | * | 10/1994 | Sasaki ........................... 106/6 |
| 6,190,443 B1 | | 2/2001 | Ohashi et al. |
| 6,280,652 B1 | * | 8/2001 | Inoue et al. ................ 252/79.1 |
| 6,354,913 B1 | * | 3/2002 | Miyashita et al. ............ 451/41 |
| 6,398,827 B1 | * | 6/2002 | Ota et al. ...................... 51/308 |
| 2001/0003672 A1 | * | 6/2001 | Inoue et al. ................. 438/690 |
| 2002/0028632 A1 | | 3/2002 | Shimamato et al. |
| 2002/0039875 A1 | * | 4/2002 | Kobayashi et al. ........... 451/36 |

FOREIGN PATENT DOCUMENTS

| | | |
|---|---|---|
| EP | 0 933 166 A1 | 8/1999 |
| EP | 1 174 483 A1 | 1/2002 |
| JP | 11 302633 A | 11/1999 |
| JP | 2002 043258 A | 2/2002 |

* cited by examiner

*Primary Examiner*—Michael Marcheschi
(74) *Attorney, Agent, or Firm*—Gerald K. Kita; Blake T. Biederman

(57) ABSTRACT

A polishing composition for polishing a semiconductor wafer includes comprises water, an abrasive that is preferably colloidal silica, water-soluble cellulose having a molecular weight of at least about 1,000,000 and an alkaline compound that is preferably ammonia. Tetra methyl ammonium hydroxide may also be added to the polishing composition.

10 Claims, 3 Drawing Sheets

POLISHING COMPOSITION

TECHNICAL FIELD

The present invention relates, in general, to chemical mechanical polishing and, more particularly, to compositions which are used as polishing slurries in the process of polishing silicon wafers for the semiconductor industry.

BACKGROUND

Silicon wafers for the semiconductor industry must possess a high degree of surface perfection before they can be useful in the device fabrication process. These surfaces are universally produced by polishing the wafer with a polishing composition (hereinafter sometimes referred to as a "slurry" from its nature). Polishing slurries generally consist of a composition which contains a concentration of submicron particles. The part, or substrate, is bathed or rinsed in the slurry in conjunction with an elastomeric pad which is pressed against the substrate and rotated such that the slurry particles are pressed against the substrate under load. The lateral motion of the pad causes the slurry particles to move across the substrate surface, resulting in wear, or volumetric removal of the substrate surface. Ideally, this process results in the selective erosion of projecting surface features so that when the process is completed a perfect plane surface is produced down to the finest level of detail.

The silicon polishing process as practiced in industry consists of two or more steps. In the first, or coarse polish step, gross defects remaining from wafer sawing and shaping operations are removed. The wafer surface appears smooth and specular but still contains numerous minute defects. These defects are removed by subsequent final polish steps which remove more material from the surface and act to polish away the surface defects thereby minimizing the surface roughness and producing a low haze surface.

The measurement of surface roughness and surface defect/particle concentrations on polished wafers is generally performed by a scanning light scattering detector. Various models; e.g. Censor ANS100, Tencor 6200 and Estek WIS9000; are widely used in the silicon wafer industry. All detectors utilize the same principle of operation, namely that they measure the degree of non-specular reflected light from the wafer surface. A high intensity laser beam is scanned across the surface of the wafer. Non-specular reflected light is collected in an off-axis detector and the signal intensity of this scattered light is analyzed. Surface roughness results in generalized light scattering of low intensity, generally termed haze. Particles or other discrete surface imperfections produce a more intense scattering which has a point source origin. The intensity of these point sources of scattering is ranked in comparison to that of latex standard calibration spheres of varying sizes. These point sources are generally refereed to as Light Point Defects, or LPDs and their distribution is ranked according to measurement technology and terminology is given by P. O. Hahn et al. in an article entitled "The Si—$SiO_2$ Interface Roughness: Causes and Effects" in C. R. Helms and B. E. Dead, Eds., "The Physics and Chemistry of $SiO_2$ and the Si—$SiO_2$ Interface, pp. 401–411, Plenum Press, New York (1988) incorporated by reference herein. So far as the present inventors are aware, in the conventional two step polishing, it was possible to obtain a substrate surface having a good surface roughness in the polishing in the second step, but the stock removal rate was very low.

For the final polishing step, particularly in finishing polishing in two steps, it has been common to carry out polishing by means of a polishing composition prepared in such a manner that aluminum oxide or other abrasive is thoroughly pulverized and adjusted for proper particle size, water is added thereto, and aluminum nitrate or various organic acids and other polishing accelerators are incorporated thereto, or a polishing composition comprising colloidal silica and water is used. However, the polishing by means of the former polishing composition had a problem that the balance between the mechanical component and the chemical component was poor, and microprotusions or fine pits tended to form. The polishing by means of the latter polishing composition had a problem such that the stock removal rate was so low that it took a long time for polishing, the productivity was low and it has been difficult to prevent formation of microprotrusions, fine pits and other surface defects.

Accordingly, it has been desired to develop a polishing composition or a surface treating composition that has a high polishing removal rate and that is capable of forming a very smooth polished surface with a low haze.

There are numerous background patents on slurries to be used for polishing silicon wafers.

Minoru and Yutaka (Japanese Unexamined Patent Publication No. 11-116942) describes a polishing slurry for silicon wafers consisting of a silicon dioxide, water, water-soluble polymer compound, basic compound, alcoholic hydroxy group compound, and hydroxy group nitrogen containing compound. No criticality of high molecular weight and high polydispersity of the water-soluble polymer compound was taught. Furthermore, it teaches the use of hydroxyethylcellulose in combination with poly vinyl alcohol but does not teach the use of hydroxyethylcellulose alone.

Miyishata and Minami (European Patent Application EP 0 933 166 A1) describes a polishing agent consisting of abrasive containing silica particles as the main component, water as a solvent, and a water-soluble cellulose. No criticality of high molecular weight and high polydispersity is taught.

BRIEF SUMMARY

The present invention provides a polishing composition which has a high polishing removal rate and which is cable of forming a very smooth polished surface with low haze.

In one aspect the invention is a polishing composition comprising peanut-like shaped colloidal silica particles, water-soluble cellulose, ammonia and water.

In another aspect the invention is a polishing composition comprising an abrasive, water-soluble cellulose having a molecular weight of at least about 1,000,000, an alkaline compound and water.

In yet another aspect the invention is a polishing composition comprising an abrasive, water-soluble cellulose having a polydispersity of at least about 5 MW/Mn, an alkaline compound and water.

Other objects, features and advantages of the present invention will become apparent from the following detailed description. It should be understood, however, that the detailed description and the specific examples, while indicating embodiments of the invention, are given by way of illustration only, the invention being defined only by the claims following this detailed description.

DETAILED DESCRIPTION OF THE PREFERRED EMBODIMENTS

Figure 1:
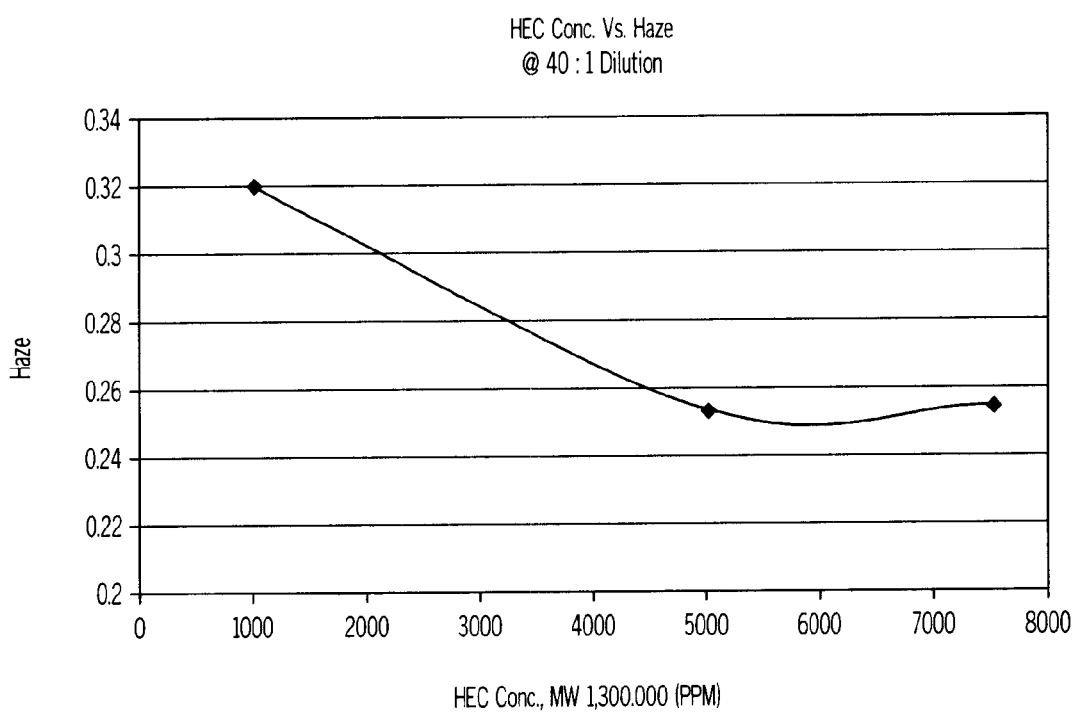
FIG. 1 is a plot illustrating the effect on substrate haze as the concentration of hydroxyethylcellulose in a composition in accordance with the present invention varies for compositions tested at a 40:1 dilution.

A final polishing composition or slurry for polishing silicon semiconductor wafers that currently outperforms the industry standard has been developed. The slurry has a higher removal rate to remove the damage layer and produces a lower haze surface compared to the corresponding existing industry standard final silicon polishing slurry. The slurry comprises an abrasive, water-soluble cellulose, an alkaline compound and water. The slurry is formed by mixing and dispersing the abrasive, water-soluble cellulose, alkaline compound and water. The method for dispersing or dissolving these components in water is optional. For example, they may be dispersed by stirring by a vane-type stirring machine or by ultrasonic dispersion. Further, the order of mixing them is optional and also may be carried out simultaneously.

In polishing a film formed on a semiconductor substrate, the slurry is diluted with water such that the diluted slurry is preferably about ½₀ to about ⅛₀ as thick as the slurry before dilution, and more preferably about ½₀ to about ¼₀ as thick as the slurry before dilution. In order to dilute the slurry, the slurry and the dispersant are supplied simultaneously through a nozzle for the slurry and another nozzle for the dispersant onto the semiconductor wafer arranged on a polishing disc. In the preferred method, the slurry and the dispersant are premixed and then applied to the semiconductor wafer.

Abrasive

In a polishing composition of the invention, the preferred abrasive used is colloidal silica. The colloidal silica particles that are preferably used are Fuso PL-3 colloidal silica available from Fuso, Inc. in Japan and Rodel Particle Inc. colloidal silica available from Rodel Nitta. These colloidal silica particles are non-spherical, exhibit a peanut like shape and have a rougher surface than standard colloidal silica. This phenomenon is achieved by joining two smaller, primary particles together to form the final secondary particle. The primary particles for the peanuts are kept below 50 nanometers. As the particle size is increased, the colloidal silica particle loses its peanut shape. For example, a 300 nm Fuso particle is round and not a peanut. This occurs from Ostwald ripening which causes the particle to become a sphere. This roughness and shape is speculated to be optimal for silicon final polishing since the particle is softer compared to conventional spherical, solid colloidal silica particles.

The amount of colloidal silica particles in a slurry of the invention that is 20:1 to 40:1 dilution is about 0.01 wt % to about 1.00 wt %, preferably about 0.10 wt % to about 0.5 wt %, based on the total amount of slurry after dilution. If the content of the abrasive is too small, the polishing removal rate will be low, and it will take a long time for processing, whereby the productivity will be too low to be practical. On the other hand, if it is too large, uniform dispersion tends to be hardly maintained, and the viscosity of the composition tends to be excessive, whereby the handling tends to be difficult.

The silica particles serve to polish the surface to be polished by a mechanical action as abrasive grains. The preferred average particle size of the silica particles to be used for the polishing composition of the present invention varies from about 20 nm to about 120 nm, more preferably from about 50 nm to about 80 nm. Since the particles are peanuts, the primary particle size is 30–35 nm. The resulting peanut-shaped secondary particle is approximately twice that size because it comprises two primary particles.

If particle size is too large, dispersion of abrasive grains tends to be hardly maintained, whereby there will be problems such that the stability of the composition deteriorates, abrasive grains tend to precipitate and scratches are likely to form at the polished wafer surface. On the other hand, if the particle size is too small, the polishing removal rate tends to be low, and it will take a long time for processing, and the productivity is too low for practical purposes.

Water-soluble Cellulose

The composition of the present invention preferably contains a water-soluble cellulose. The wafer surface immediately after polishing has hydrophobicity. Sometimes, after polishing, dust in air or other foreign matters are deposited on the wafer surface in such a state, that the abrasive in the composition or the foreign matters will be dried and solidified to firmly fix on the wafer surface, thus causing depositions on the wafer surface. Whereas, in the polishing composition of the present invention, the water-soluble cellulose functions to provide hydrophilicity on the wafer surface so that the wafer surface will not dry up in a short period of time from the completion of the polishing to the subsequent step of buffing or cleaning. In a preferred method, substrate wafer is buffed with water after polishing. The combination of the water buff with the surfactant on the wafer keeps defectivity low.

The water-soluble cellulose coats either the colloidal silica particle or the wafer surface. The water-soluble cellulose then buffers the particle hitting the surface. The water-soluble cellulose serves to suppress the damage done to the wafer during the polishing step. The water-soluble cellulose is required to be dissolved in the composition and is selected from the group comprising hydroxymethylcellulose, hydroxypropylcellulose, hydroxy propylmethyl cellulose and hydroxyethylcellulose. Hydroxyethylcellulose is the preferred water-soluble cellulose. Most preferably, the hydroxyethylcellulose has a high molecular weight and polydispersity. The molecular weight of the hydroxyethyl cellulose is preferably above about 1,000,000 and the polydispersity is above about 5 molecular weight/molecular number (MW/Mn). Polydispersity measures the variation in the size of the polymer chains. The amount of the hydroxyethylcellulose is preferably about 0.006% to about 1% by weight, and more preferably about 0.01% to about 0.5% by weight, and most preferably about 0.005% to about 0.03% by weight, based on the total amount of the slurry after dilution. If the amount exceeds 2% by weight, the viscosity of the slurry is excessively increased so as to make it difficult to handle the slurry smoothly. If the content of hydroxyethylcellulose is too high, it fully coats the colloidal silica particles and/or the substrate surface in a thick layer that could impede silicon removal. By using a slurry having a high molecular weight and a high polydispersity, it was found that the slurry had greater surface coverage over the substrate and it had a higher packing density on the surface of the substrate, thereby providing an increased removal rate.

Alkali Compound

The alkali compound controls the pH of the slurry and is added to put the slurry of the present invention on the alkali side so as to promote the polishing function. Also, where the slurry contains silica, the pH controller is added to set the pH value in the polishing step at 8 or more so as to prevent agglomeration of silica and water-soluble cellulose. The alkali compound that is preferably used is ammonia. Increasing the ammonia concentration in the slurry will increase the hydroxy concentration on the wafer surface during polishing and promotes the silicon etching rate. It is believed that this is the preferred method of increasing removal rate since the silica particles will also be more stable in a higher pH regime. The amount of the ammonia may be about 0.006% to about 0.075% by weight, preferably about 0.0125% to about 0.0375% by weight, based on the total weight of the slurry after dilution.

Tetra Methyl Ammonium Hydroxide

It was discovered that the addition of tetra methyl ammonium hydroxide (TMAH) greatly improves the performance of the slurry of the present invention by providing a lower removal rate and a better, lower, haze. TMAH is a compound that is sometimes used in the cleaning solutions of silicon wafers. TMAH at the same time could also help stabilize silica particles in the slurry.

TMAH helps create a hydrophobic wafer surface during polishing depending on its level of surface coverage with respect to the hydroxyethylcellulose. TMAH is observed to decrease the polishing temperature. The amount of the TMAH may be about 0.0003% to about 0.05% by weight, preferably about 0.0006% to about 0.02% by weight, based on the total weight of the slurry after dilution.

EXAMPLES

Without further elaboration it is believed that one skilled in the art can, using the foregoing description, practice the invention to its fullest extent. The following specific Examples are, therefore, to be construed as merely illustrative and are not intended to limit the disclosure in any way whatsoever.

Example 1

Sample compositions, in accordance with the present invention, were tested at varying concentrations of hydroxyethylcellulose. The concentrations and properties of the other materials in the composition were kept the same for each sample composition. Table I lists formulations tested at a 40:1 dilution. FIG. 1 illustrates the effect hydroxyethylcellulose has on haze at varying concentrations of hydroxyethylcellulose for slurries at a 40:1 dilution.

TABLE I

HEC concentration formulations (40:1 dilution)

| Slurry | Target Abrasive | HEC (MW) | HEC Conc. | NH$_4$OH Conc. | Target Dilution |
|---|---|---|---|---|---|
| RPTA-0113 | 4.00% | 1,300,000 | 0.50% | 0.500% | 40:1 |
| RPTA-0114 | 4.00% | 1,300,000 | 0.75% | 0.500% | 40:1 |
| RPTA-0119 | 4.00% | 1,300,000 | 0.10% | 0.500% | 40:1 |

Example 2

Figure 2:
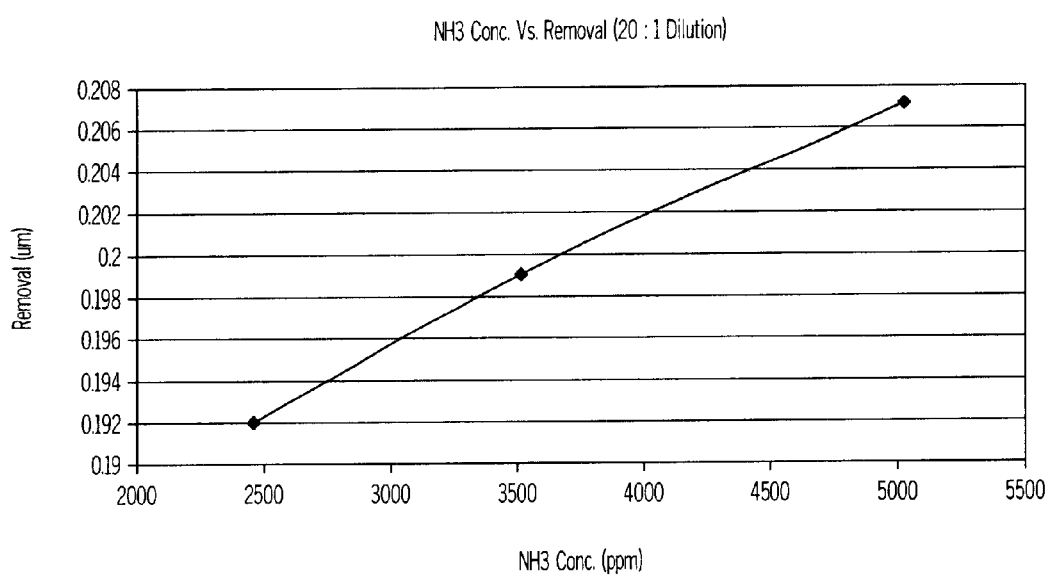
FIG. 2 is a plot illustrating the polish removal rate for varying concentrations of ammonia in polishing compositions in accordance with the present invention tested at 20:1 dilution.

Sample compositions, in accordance with the present invention, were tested at varying concentrations of ammonia. The concentrations and properties of the other materials in the composition were kept the same for each sample composition. Table II lists formulations tested at a 20:1 dilution. FIG. 2 illustrates how the removal rate is affected for varying concentrations of ammonia for a slurry with 20:1 dilution.

TABLE II

NH$_4$OH Concentration Testing Formulations.

| Slurry | Target Abrasive | HEC (MW) | HEC Conc. | NH$_4$OH Conc. | Target Dilution |
|---|---|---|---|---|---|
| RPTA-0101 | 9.50% | 1,300,000 | 0.25% | 0.245% | 20:1 |
| RPTA-0107 | 9.50% | 1,300,000 | 0.25% | 0.500% | 20:1 |
| RPTA-0111 | 9.50% | 1,300,000 | 0.25% | 0.350% | 20:1 |

Example 3

Figure 3:
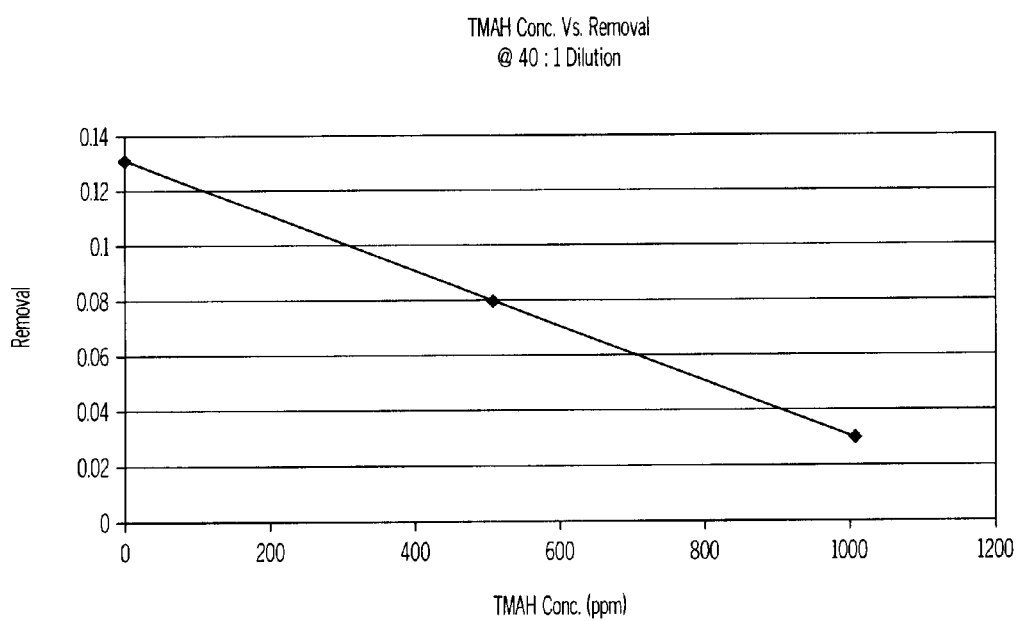
FIG. 3 is a plot illustrating the polish removal rate at varying concentrations of tetra methyl ammonium hydroxide for polishing compositions in accordance with the present invention tested at 40:1 dilution.

Sample compositions, in accordance with the present invention, were tested at varying concentrations of tetra methyl ammonium hydroxide. The concentrations and properties of the other materials in the composition were kept the same for each sample composition. Table III lists TMAH formulations tested at both 20:1 and 40:1 dilutions. Tables IV and V show the polishing results obtained with the formulations listed in Table III. All testing was performed on the Strausbaugh 6EC. The 20:1 dilution Table III formulations were polished for 8 and 10 minutes minutes, and the 40:1 dilution Table III formualtions were polished for 6 minutes under the same polishing parameters. The pad used for the formulation screening was a SPM3100 pad. FIG. 3 illustrates how the removal rate decreases as the concentration of TMAH is increased. Tables IV and V show decreasing removal rate and haze with increasing TMAH.

TABLE III

TMAH testing formulations.

| Slurry | Target Abrasive | HEC (MW) | HEC Conc. | TMAH Conc. | NH$_4$OH Conc. | Target Dilution |
|---|---|---|---|---|---|---|
| RPTA-0107 | 9.50% | 1,300,000 | 0.25% | 0.00% | 0.50% | 20 |
| RPTA-0140 | 9.50% | 1,300,000 | 0.25% | 0.025% | 0.50% | 20 |
| RPTA-0113 | 4.00% | 1,300,000 | 0.50% | 0.00% | 0.50% | 40 |
| RPTA-0117 | 4.00% | 1,300,000 | 0.50% | 0.05% | 0.50% | 40 |
| RPTA-0115 | 4.00% | 1,300,000 | 0.50% | 0.10% | 0.50% | 40 |

TABLE IV

TMAH formulation polishing results at 20:1

| Slurry Type | Dilution | Temp (° C.) | Removal ($\mu$m) | Polish Time (min) | Removal Rate ($\mu$m/min) | Haze | LPD |
|---|---|---|---|---|---|---|---|
| RPTA0107 | 20:1 | 30.8 | 0.2486 | 8 | 0.0311 | 0.289 | 221 |
| RPTA0107 | 20:1 | 31.3 | 0.2500 | 8 | 0.0313 | 0.290 | 149 |
| RPTA0140 | 20:1 | 25.8 | 0.0122 | 10 | 0.0012 | 0.252 | 234 |
| RPTA0140 | 20:1 | 26.1 | 0.0123 | 10 | 0.0012 | 0.268 | 317 |

TABLE V

TMAH formulation polishing results at 40:1

| Slurry Type | Dilution | Temp (° C.) | Removal (μm) | Polish Time (min) | Removal Rate (μm/min) | Haze | LPD |
|---|---|---|---|---|---|---|---|
| RPTA0113 | 40:1 | 29.8 | 0.1311 | 6 | 0.0218 | 0.253 | 123 |
| RPTA0113 | 40:1 | 30.4 | 0.1311 | 6 | 0.0219 | 0.260 | 182 |
| RPTA0117 | 40:1 | 27.9 | 0.0806 | 6 | 0.0134 | 0.219 | 173 |
| RPTA0117 | 40:1 | 28.3 | 0.0779 | 6 | 0.0130 | 0.232 | 151 |
| RPTA0115 | 40:1 | 25.7 | 0.0301 | 6 | 0.0050 | 0.213 | 159 |
| RPTA0115 | 40:1 | 25.2 | 0.0301 | 6 | 0.0050 | 0.210 | 276 |

It is contemplated that numerous modifications may be made to the polishing composition of the present invention without departing from the spirit and scope of the invention as defined in the claims. Accordingly, while the present invention has been described herein in relation to several embodiments, the foregoing disclosure is not intended or to be construed to limit the present invention or otherwise to exclude any such other embodiments, arrangements, variations, or modifications and equivalent arrangements. Rather, the present invention is limited only by the claims appended hereto and the equivalents thereof.

What is claimed is:

1. A polishing composition useful for polishing silicon wafers comprising by weight percent:

0.01 to 1 peanut shaped colloidal silica particles, the peanut shaped silica particles having a primary particle size of less than 50 nm;

a water-soluble cellulose for providing a hydrophilic surface to the silicon wafers;

0.006 to 0.075 ammonia for increasing pH to at least 8 and increasing the silicon etch rate; and water.

2. The polishing composition of claim 1, wherein the water-soluble cellulose includes hydroxyethylcellulose.

3. The polishing composition of claim 2, wherein the hydroxyethylcellulose has a polydispersity of at least about 5 MW/Mn.

4. The polishing composition of claim 1, wherein the peanut shaped colloidal silica particles include secondary particles and the secondary particles have an average particle size ranging from about 20 nm to about 120 nm.

5. The polishing composition of claim 1 wherein the polishing composition further comprises tetra methyl ammonium hydroxide and the tetra methyl ammonium hydroxide is 0.0003 to 0.05 weight percent.

6. A polishing composition useful for polishing silicon wafers comprising by weight percent:

0.01 to 1 peanut shaped colloidal silica particles, the peanut shaped silica particles having a primary particle size of less than 50 nm;

0.006 to 1 water-soluble cellulose for providing a hydrophilic surface to the silicon wafers;

0.0003 to 0.05 weight percent tetra methyl ammonium hydroxide;

0.0125 to 0.0375 ammonia for increasing pH to at least 8 and increasing the silicon etch rate; and water.

7. The polishing composition of claim 6, wherein the water-soluble cellulose includes hydroxyethylcellulose.

8. The polishing composition of claim 7, wherein the hydroxyethylcellulose has a polydispersity of at least about 5 MW/Mn.

9. The polishing composition of claim 6, wherein the peanut shaped colloidal silica particles include secondary particles and the secondary particles have an average particle size ranging from about 20 nm to about 120 nm.

10. The polishing composition of claim 6 including 0.0006 to 0.02 weight percent tetra methyl ammonium hydroxide.

* * * * *